(12) United States Patent
Cheng et al.

(10) Patent No.: US 11,481,071 B2
(45) Date of Patent: Oct. 25, 2022

(54) TOUCH DISPLAY PANEL

(71) Applicant: Au Optronics Corporation, Hsinchu (TW)

(72) Inventors: Mao-Hsun Cheng, Hsinchu (TW);
Chun-Cheng Hung, Hsinchu (TW);
Kuang-Hsiang Liao, Hsinchu (TW);
Ching-Sheng Cheng, Hsinchu (TW);
Li-Wei Shih, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/522,903

(22) Filed: Nov. 10, 2021

(65) Prior Publication Data

US 2022/0214758 A1 Jul. 7, 2022

(30) Foreign Application Priority Data

Jan. 6, 2021 (TW) .................................. 110100424

(51) Int. Cl.
*G06F 3/042* (2006.01)
*G09G 3/3208* (2016.01)
*G06F 3/041* (2006.01)

(52) U.S. Cl.
CPC ............ *G06F 3/042* (2013.01); *G06F 3/0412* (2013.01); *G09G 3/3208* (2013.01)

(58) Field of Classification Search
CPC ................................ G06F 3/042; G06F 3/0412
See application file for complete search history.

(56) References Cited

U.S. PATENT DOCUMENTS

| 9,007,337 | B2 | 4/2015 | Chien et al. |
| 11,231,822 | B2* | 1/2022 | Tada ..................... G06F 3/0412 |
| 2010/0149116 | A1 | 6/2010 | Yang et al. |
| 2013/0147730 | A1 | 6/2013 | Chien et al. |
| 2016/0034072 | A1 | 2/2016 | Yang et al. |
| 2019/0341428 | A1* | 11/2019 | Lee ..................... H01L 51/5036 |
| 2020/0111851 | A1* | 4/2020 | Park ..................... G06F 3/0412 |
| 2021/0264823 | A1* | 8/2021 | Heo ..................... H01L 27/323 |

FOREIGN PATENT DOCUMENTS

| CN | 106484157 | 3/2017 |
| TW | 201022761 | 6/2010 |
| TW | I456321 | 10/2014 |
| WO | 2016200069 | 12/2016 |

* cited by examiner

*Primary Examiner* — Robin J Mishler
(74) *Attorney, Agent, or Firm* — JCIPRNET

(57) ABSTRACT

A touch display panel including a pixel defining layer, a first light emitting structure, a second light emitting structure, a first light sensing device and a touch electrode layer is provided. The pixel defining layer has a first pixel opening and a second pixel opening. The first light sensing device is adjacently disposed on a first side of the first pixel opening. A first edge defining a first electrode opening of the touch electrode layer and a second edge defining the first pixel opening of the pixel defining layer have a first spacing on the first side of the first pixel opening. A third edge defining a second electrode opening of the touch electrode layer and a fourth edge defining the second pixel opening of the pixel defining layer have a second spacing on a side of the second pixel opening. The first spacing is greater than the second spacing.

10 Claims, 4 Drawing Sheets

TOUCH DISPLAY PANEL

CROSS-REFERENCE TO RELATED APPLICATION

This application claims the priority benefit of Taiwan application serial no. 110100424, filed on Jan. 6, 2021. The entirety of the above-mentioned patent application is hereby incorporated by reference herein and made a part of this specification.

BACKGROUND

Technology Field

The disclosure relates to a display technology, and particularly, to a touch display panel.

Description of Related Art

To increase the screen-to-body ratio of the display panel, under-screen fingerprint sensing technology has become a trend. To put it simply, the under-screen fingerprint sensing technology integrates the light sensing device with the touch display panel of the electronic device or is disposed under the touch display panel. After the electronic device detects that a user touches the touch display panel, the electronic device controls the touch display panel to emit light to illuminate the surface of the finger of the user. The light can be reflected by the finger of the user into the light sensing device in the touch display panel, and the light sensing device converts the reflected light into a digital image signal to obtain the finger print image of the user. However, the touch sensing layer of the touch display panel mostly uses metal materials. In the process of fingerprint recognition, part of the light emitted by the touch display panel may be transmitted to the light sensing device through the internal reflection of the touch sensing layer and become signal noise during fingerprint recognition, and thereby the accuracy of fingerprint recognition is affected.

SUMMARY

The disclosure provides a touch display panel, which has favorable light sensing sensitivity and accuracy.

The touch display panel of the disclosure includes a first substrate, a second substrate, a pixel defining layer, a first light emitting structure, a second light emitting structure, a first light sensing device, and a touch electrode layer. The second substrate is disposed opposite to the first substrate. The pixel defining layer is disposed on the first substrate and has a first pixel opening and a second pixel opening. The first pixel opening and the second pixel opening are adjacently disposed along a first direction. The first light emitting structure and a second light emitting structure are disposed in the first pixel opening and the second pixel opening, respectively. The first light sensing device and the first pixel opening are adjacently disposed along a second direction, and the first light sensing device is disposed on a first side of the first pixel opening. The first direction intersects the second direction. The touch electrode layer is disposed on the second substrate and has a first electrode opening, a second electrode opening, and a third electrode opening of the first light sensing device overlapped with the first light emitting structure and the second light emitting structure, respectively. The touch electrode layer has a first edge defining the first electrode opening. The pixel defining layer has a second edge defining the first pixel opening. The first edge and the second edge have a first spacing along the second direction on the first side of the first pixel opening. The touch electrode layer further has a third edge defining the second electrode opening. The pixel defining layer further has a fourth edge defining the second pixel opening. The third edge and the fourth edge have a second spacing on a same side of the second pixel opening along the second direction, and the first spacing is greater than the second spacing.

In summary, in the touch display panel of an embodiment of the disclosure, two pixel openings of the pixel defining layer are overlapped with two electrode openings of the touch electrode layer, respectively. The spacing between the edge of one pixel opening and the edge of the corresponding electrode opening on one side of the pixel opening where the light sensing device is disposed is greater than the spacing between the edge of another pixel opening and the edge of another corresponding electrode opening on one side of the another pixel opening where no light sensing device is disposed. Accordingly, the light emitted by the light emitting structure disposed in the pixel opening may be prevented from being transmitted to the light sensing device through the internal reflection of the touch electrode layer, and thereby the light sensing sensitivity and accuracy of the touch display panel are improved.

DESCRIPTION OF THE EMBODIMENTS

Figure 1:
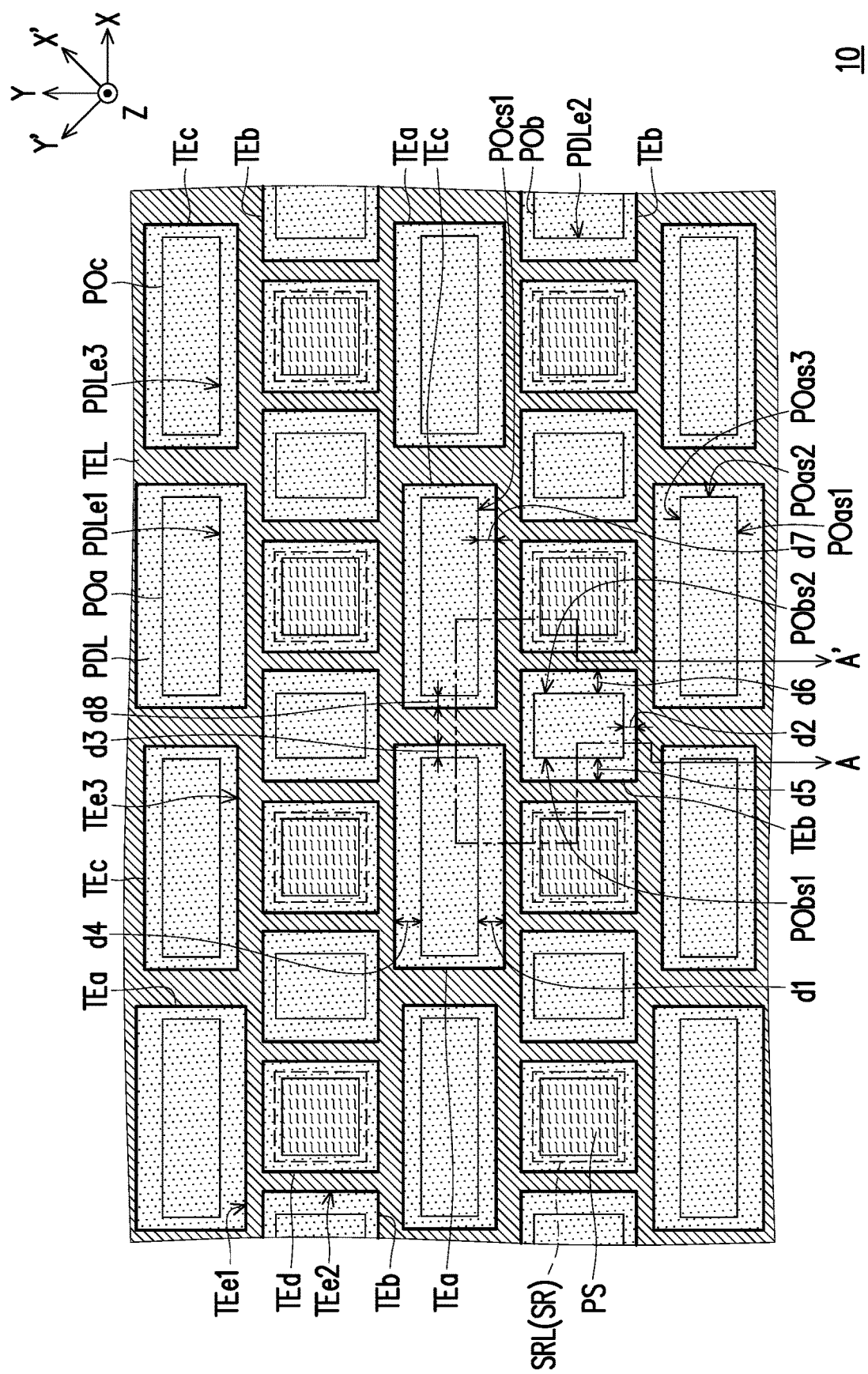
FIG. 1 is a schematic top view of a touch display panel according to an embodiment of the disclosure.

The term "about", "similarly", "essentially", or "substantially" as used herein is inclusive of the stated value and means within an acceptable range of deviation for the particular value as determined by people having ordinary skill in the art, considering the measurement in question and the error associated with measurement of the particular quantity (i.e., the limitations of the measurement system). For example, "about" may mean within one or more standard deviations or, for example, ±30%, ±20%, ±10%, or ±5% of the stated value. Furthermore, a relatively acceptable range of deviation or standard deviation may be chosen for the term "about", "similarly", "essentially", or "substantially" as used herein based on measurement properties, cutting properties, or other properties, instead of applying one standard deviation across all the properties.

In the drawings, the thickness of layers, films, panels, regions, etc., are enlarged for clarity. It should be understood that when an element such as a layer, film, region, or substrate is referred to as being "on" or "connected" to another element, it can be directly on or connected to the other element, or Intermediate elements may also be present. In contrast, when an element is referred to as being "directly on" or "directly connected to" another element, there are no intervening elements. As used herein, "connection" can refer to physical and/or electrical connection. Furthermore, "electrical connection" can mean that there are other components between the two components.

Reference will now be made in detail to the exemplary embodiments of the disclosure, and examples of the exemplary embodiments are illustrated in the accompanying drawings. Whenever possible, the same component symbols are used in the drawings and descriptions to indicate the same or similar parts.

Figure 2:
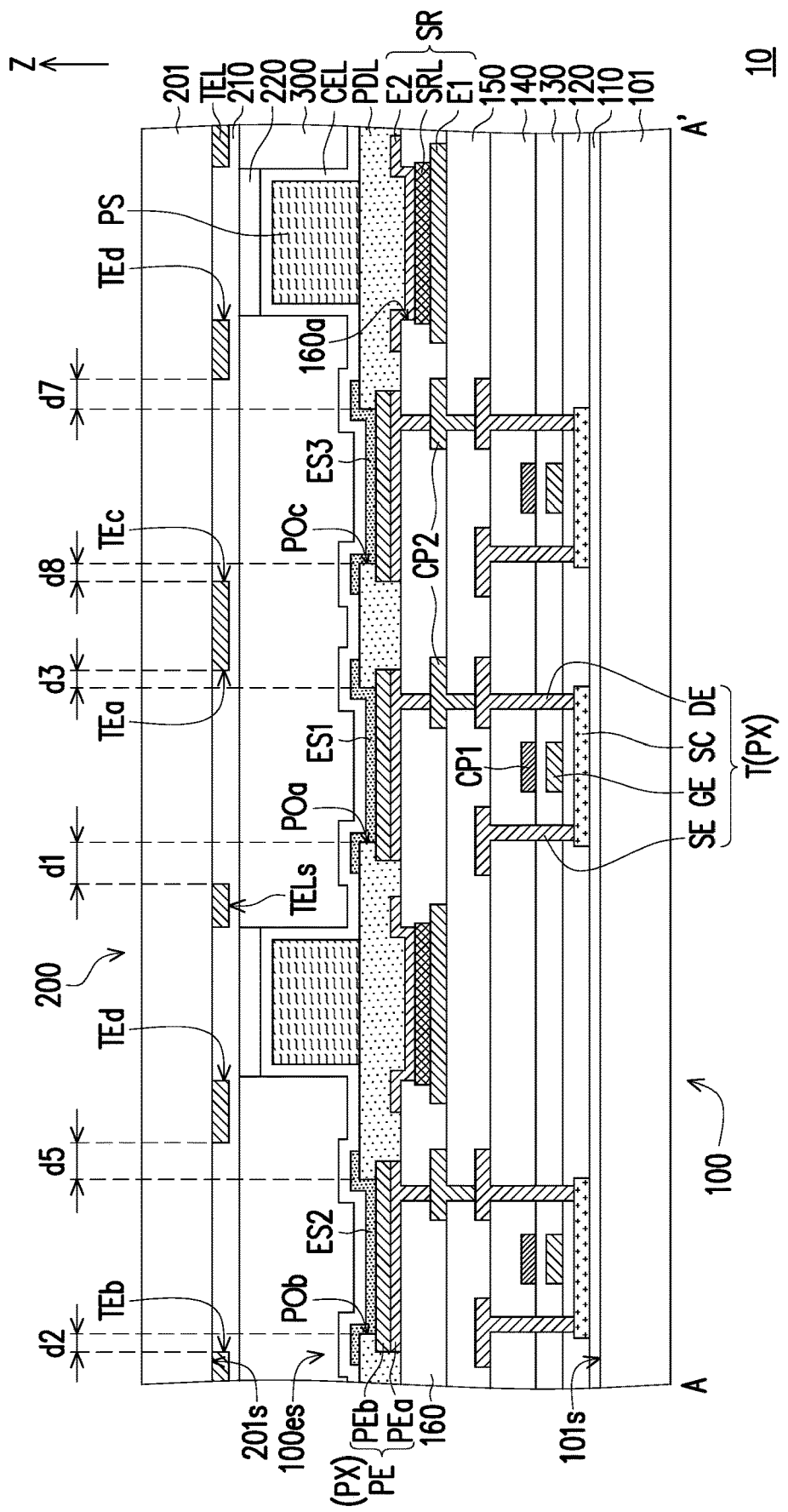
FIG. 2 is a schematic cross-sectional view of the touch display panel of FIG. 1.
Figure 3:
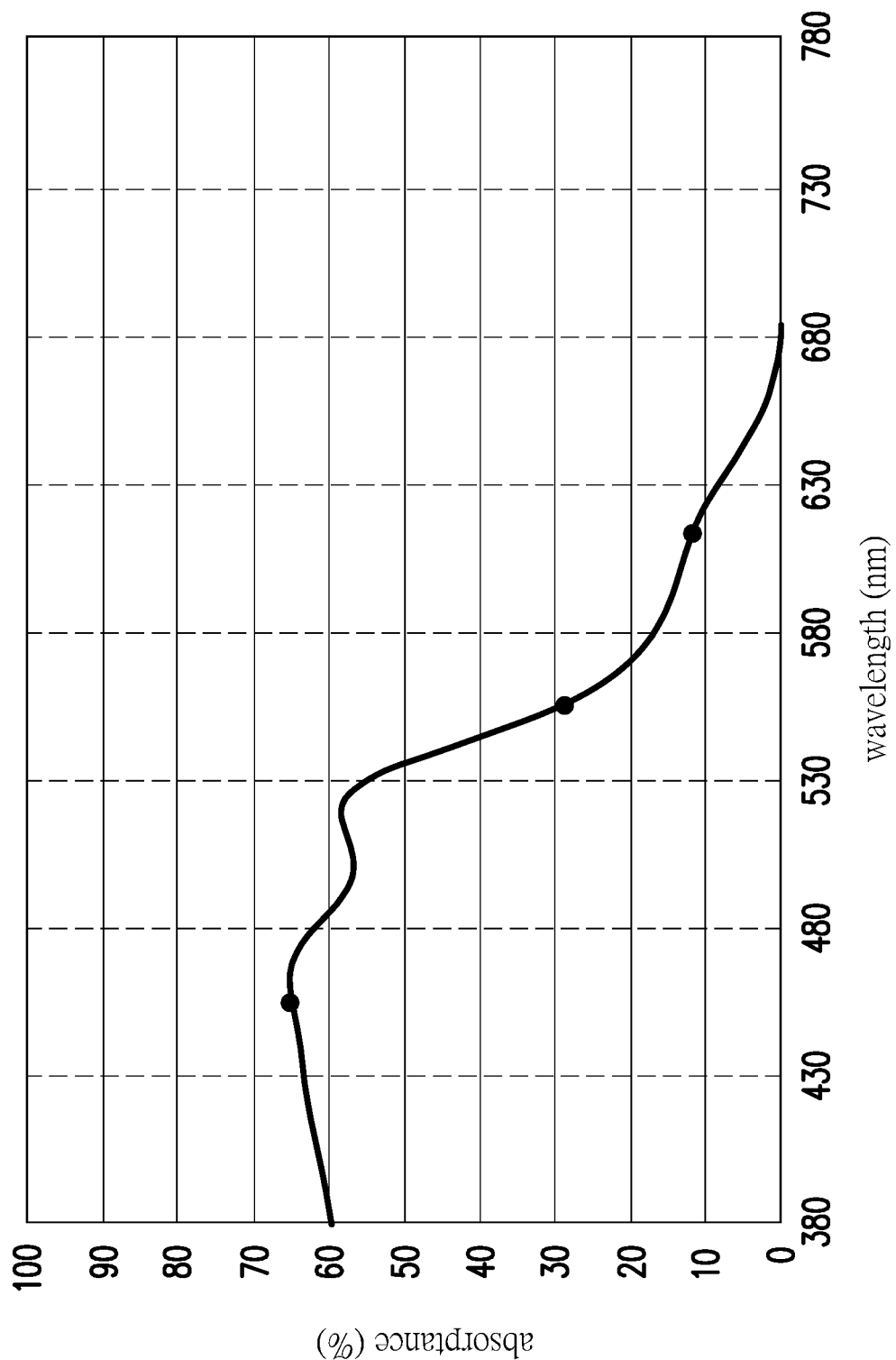
FIG. 3 is a curve diagram illustrating the relationship between the absorptance and the wavelength of the light sensing layer of the light sensing device of FIG. 2.

FIG. 1 is a schematic top view of a touch display panel according to an embodiment of the disclosure. FIG. 2 is a schematic cross-sectional view of the touch display panel of FIG. 1. FIG. 3 is a curve diagram illustrating the relationship between the absorptance and the wavelength of the light sensing layer of the light sensing device of FIG. 2. Note that for the clarity, FIG. 1 only illustrates a touch electrode layer TEL, a pixel defining layer PDL, a light sensing layer SRL, and a spacer PS of FIG. 2.

Referring to FIG. 1 and FIG. 2, a touch display panel 10 includes a pixel array substrate 100 and a touch sensing substrate 200. The touch sensing substrate 200 is disposed on a light emitting side 100es of the pixel array substrate 100. In the embodiment, the touch display panel 10 is a self-luminous display panel, such as an organic light emitting diode (OLED) panel, but the disclosure is not limited thereto. In other embodiments, the touch display panel may also be a micro light emitting diode (micro-LED) panel or a mini light emitting diode (mini-LED) panel. In the embodiment, an encapsulation layer 300 may be further disposed between the pixel array substrate 100 and the touch sensing substrate 200, and the material of the encapsulation layer 300 is, for example, acrylic, epoxy, hexamethyldisiloxane (HMDSO), other suitable organic materials, or other suitable inorganic materials (e.g., silicon nitride).

The pixel array substrate 100 includes a substrate 101, a pixel driving layer, and the pixel defining layer PDL. The pixel driving layer is disposed on the substrate 101 and has multiple signal lines (not shown) and multiple pixel structures PX. The signal lines are, for example, a combination of multiple data lines, multiple scan lines, and multiple power lines. The pixel structure PX includes at least one active device T and a pixel electrode PE, and the pixel electrode PE is electrically connected to at least one of the at least one active device. In the embodiment, the method of forming the active device T may include the following steps. A buffer layer 110, a semiconductor pattern SC, a first gate insulating layer 120, a gate GE, a second gate insulating layer 130, a conductive pattern CP1, an interlayer insulating layer 140, a source SE and a drain DE are sequentially formed on the substrate 101. The source SE and the drain DE penetrate the interlayer insulating layer 140, the second gate insulating layer 130, and the first gate insulating layer 120 to be electrically connected to two different regions (e.g., the source region and the drain region) of the semiconductor pattern SC, respectively.

In the embodiment, the gate GE of the active device T may be selectively disposed above the semiconductor pattern SC to form a top-gate thin film transistor (TFT), but the disclosure is not limited thereto. According to other embodiments, the gate GE of the active device may also be disposed under the semiconductor pattern SC to form a bottom-gate TFT. On the other hand, the material of the semiconductor pattern SC is, for example, a polysilicon semiconductor material, that is, the active device T may be a low temperature polysilicon thin film transistor (LTPS TFT). However, the disclosure is not limited thereto, and in other embodiments, the active device may also be an amorphous silicon TFT (a-Si TFT), a microcrystalline silicon TFT (micro-Si TFT), or metal oxide transistors.

Note that the gate GE, the source SE, the drain DE, the conductive pattern CP1, the buffer layer 110, the first gate insulating layer 120, the second gate insulating layer 130, the interlayer insulating layer 140, and a planarization layer 150 respectively may be configured to any gate, any source, any drain, any conductive pattern, any buffer layer, any gate insulating layer, and any interlayer insulating layer and any planarization layer by those with ordinary knowledge in the technical field to implement, and the gate GE, the source SE, the drain DE, the conductive pattern CP1, the buffer layer 110, the first gate insulating layer 120, the second gate insulating layer 130, the interlayer insulating layer 140, and the planarization layer 150, respectively may be formed by any method known to those with ordinary knowledge in the technical field, which are not repeated herein.

Furthermore, the touch display panel 10 further includes multiple light sensing devices SR disposed on the pixel array substrate 100. For example, after the formation of the active device T is completed, a planarization layer 150, a first conductive layer, the light sensing layer SRL, a planarization layer 160, and a second conductive layer are sequentially formed on the interlayer insulating layer 140, the source SE, and the drain DE. The first conductive layer includes multiple first electrodes E1 and multiple conductive patterns CP2, and the second conductive layer includes multiple second electrodes E2. The planarization layer 160 has multiple openings 160a, and the second electrodes E2 respectively extend from the planarization layer 160 into the openings 160a to be electrically connected to the light sensing patterns of the light sensing layer SRL and form multiple light sensing devices SR. In the embodiment, the pixel electrode PE is electrically connected to the active device T through the conductive pattern CP2, but it is not limited thereto.

The pixel electrodes PE of the pixel structures PX are disposed on the planarization layer 160. In the embodiment, the pixel electrode PE is, for example, a stacked structure of a first conductive sublayer PEa and a second conductive sublayer PEb, the first conductive sublayer PEa and the first electrode E1 of the light sensing device SR may selectively belong to the same film layer (i.e., the first conductive layer), and the second conductive sublayer PEb is disposed on the first conductive sublayer PEa and belong to the third conductive layer. However, the disclosure is not limited thereto. According to other embodiments, the pixel electrode PE and the second electrode E2 of the light sensing device SR may belong to different film layers.

For example, in the embodiment, the material of the first conductive sublayer PEa includes metal oxides, such as indium tin oxide, indium zinc oxide, aluminum tin oxide, aluminum zinc oxide, other suitable oxides, or a stacked layer of at least two thereof. The material of the second conductive sublayer PEb includes metal, alloy, nitride of metal material, oxide of metal material, oxynitride of metal material, other suitable materials, or a stacked layer of metal materials and other conductive materials, but the disclosure is not limited thereto.

Furthermore, the pixel defining layer PDL is disposed on the pixel electrodes PE and has multiple pixel openings (e.g., multiple pixel openings POa, multiple pixel openings POb, and multiple pixel openings POc). The pixel openings respectively overlap the pixel electrodes PE in the normal direction (e.g., a direction Z) of a surface 101s of the substrate 101 and expose part of the surface of the pixel electrodes PE. The touch display panel 10 further includes multiple light emitting structures respectively disposed in the pixel openings and electrically connected to the pixel electrodes PE. In the embodiment, the light emitting structures include multiple light emitting structures ES1, multiple light emitting structures ES2, and multiple light emitting structures ES3 respectively disposed in the pixel openings POa, the pixel openings POb, and the pixel openings POc.

The material of the pixel defining layer PDL includes inorganic materials (e.g., silicon oxide, silicon nitride, silicon oxynitride, other suitable materials, or a stacked layer of at least two thereof), organic materials (e.g., polyester (PET), polyolefin, polypropylene, polycarbonate, polyalkylene oxide, polyphenylene, polyether, polyketone, polyol, polyaldehyde Class, other suitable materials, or a combination thereof), other suitable materials, or a combination thereof.

The pixel array substrate 100 further includes a common electrode layer CEL covering multiple light emitting structures and the pixel defining layer PDL. The light emitting structures are respectively sandwiched between the common electrode layer CEL and the pixel electrodes PE and form multiple light emitting elements. In the embodiment, to allow the light emitted by the light emitting elements to be emitted from the light emitting side 100es of the pixel array substrate 100, the common electrode layer CEL is a light-transmitting electrode, for example. The material of the light-transmitting electrode includes metal oxide, such as indium tin oxide, indium zinc oxide, aluminum tin oxide, aluminum zinc oxide, other suitable oxides, or a stacked layer of at least two thereof.

Note that in the embodiment, multiple spacers PS may be optionally disposed on the portion of the pixel defining layer PDL that is overlapped with the light sensing device SR, and the material of the spacers PS is a photoresist material with certain transmittance, for example.

On the other hand, the touch sensing substrate 200 includes a substrate 201, the touch electrode layer TEL, an insulating layer 210, and multiple insulating patterns 220. The touch electrode layer TEL is disposed on a surface 201s of the substrate 201 facing the pixel array substrate 100. The insulating layer 210 covers the touch electrode layer TEL and part of the surface 201s of the substrate 201. Specifically, the insulating patterns 220 are disposed on the insulating layer 210 and overlapped with the spacers PS respectively on the pixel array substrate 100 in the normal direction (e.g., the direction Z) of the surface 201s of the substrate 201. Accordingly, the signal-to-noise ratio (SNR) of touch sensing of the touch sensing substrate 200 may be improved.

The touch electrode layer TEL has multiple electrode openings, and the electrode openings respectively are overlapped with the pixel openings of the pixel defining layer PDL and the light sensing devices SR in the direction Z. For example, the electrode openings include multiple electrode openings TEa, multiple electrode openings TEb, and multiple electrode opening Tec, and multiple electrode openings Ted that are overlapped with the pixel openings POa, the pixel openings POb, the pixel openings POc, and the light sensing devices SR, respectively.

In the embodiment, the light sensing devices SR are disposed in multiple rows and columns in the direction X and the direction Y respectively, that is, the light sensing devices SR are disposed in an array on the pixel array substrate 100. A pixel opening POa and a pixel opening POc are disposed on opposite sides of each light sensing device SR in the direction Y, and two pixel openings POb are disposed on opposite sides in the direction X, respectively. More specifically, the pixel openings POa, the pixel openings POc, and the electrode openings TEd are alternately disposed in direction Y; the electrode openings TEd and the pixel openings POb are alternately disposed in direction X; pixel openings POa and pixel openings POb are alternately disposed in direction Y'; and the pixel openings POb and the pixel openings POc are alternately disposed in the direction X'. The direction X, the direction Y, the direction X', and the direction Y' intersect one other.

From another point of view, two light sensing devices SR are disposed respectively on opposite sides (e.g., a first side POas1 and a third side POas3) of the pixel opening POa in the direction Y, and two pixel openings POc are respectively disposed on the opposite sides in the direction X. Two light sensing devices SR are disposed respectively on opposite sides (e.g., a first side PObs1 and a second side PObs2) of the pixel opening POb in the direction X, and one pixel opening POa and one pixel opening POc are disposed on both opposite sides in the direction Y.

Specifically, the touch electrode layer TEL has an edge TEe1 that defines the electrode opening TEa, an edge TEe2 that defines the electrode opening TEb, and an edge TEe3 that defines the electrode opening Tec. The pixel defining layer PDL has an edge PDLe1 that defines the pixel opening POa, an edge PDLe2 that defines the pixel opening POb, and an edge PDLe3 that defines the pixel opening POc. The edge TEe1 of the touch electrode layer TEL and the edge PDLe1 of the pixel defining layer PDL have a spacing d1 on the first side POas1 of the pixel opening POa along the direction Y, and the edge TEe2 of the touch electrode layer TEL and the edge PDLe2 of the pixel defining layer PDL have a spacing d2 on the same side of the pixel opening POb along the direction Y.

The light sensing device SR is disposed on the first side POas1 of the pixel opening POa, and no light sensing device SR is disposed on the opposite sides of the pixel opening POb along the direction Y. Therefore, with the spacing d1 between the edge TEe1 of the penetrating electrode opening TEa and the edge PDLe1 of the pixel opening POa being greater than the spacing d2 between the edge TEe2 of the electrode opening TEb and the edge PDLe2 of the pixel opening POb, the light emitted by the light emitting structure ES1 may be prevented from being reflected to the light sensing layer SRL of the adjacent light sensing device SR through the surface TELs of the touch electrode layer TEL, and therefore the signal-to-noise ratio of the sensing of the light sensing device SR is increased, which contributes to improving the light sensing sensitivity and accuracy of the touch display panel 10.

On the other hand, the edge TEe1 of the touch electrode layer TEL and the edge PDLe1 of the pixel defining layer PDL have a spacing d3 along the direction X on the second side POas2 of the pixel opening POa. Since no light sensing device SR is disposed on opposite sides of the pixel opening POa in the direction X, the spacing d3 between the edge TEe1 of the electrode opening TEa and the edge PDLe1 of the pixel opening POa may be different from the spacing d1. In the embodiment, the spacing d3 may be less than the spacing d1, which contributes to increasing the design flexibility of the light emitting structure ES1. However, the disclosure is not limited thereto. According to other embodiments, the spacing d3 may also be equal to the spacing d1.

Similarly, the light sensing device SR is also disposed on the third side POas3 of the pixel opening POa, so a spacing d4 between the edge PDLe1 of the pixel opening POa and the edge TEe1 of the electrode opening TEa on the third side POas3 of the pixel opening POa along the direction Y is also greater than the spacing d3 and the spacing d2 and substantially equal to the spacing d1, but the disclosure is not limited thereto. In other embodiments, the spacing d4 may not be equal to the spacing d1 but yet greater than the spacing d3 and the spacing d2.

The edge PDLe2 of the pixel opening POb and the edge TEe2 of the electrode opening TEb have a spacing d5 and a spacing d6 on the first side PObs1 and the second side PObs2 of the pixel opening POb along the direction X, respectively. Since the light sensing devices SR are disposed on opposite sides of the pixel opening POb in the direction X, with the spacing d5 and spacing d6 between the edge TEe2 of the electrode opening TEb and the edge PDLe2 of the pixel opening POb being greater than the spacing d2 between the edge TEe2 of the electrode opening TEb and the edge PDLe2 of the pixel opening POb, the light emitted by the light emitting structure ES2 may be prevented from being reflected to the light sensing layer SRL of the adjacent light sensing device SR through the surface TELs of the touch electrode layer TEL, and therefore the signal-to-noise ratio of the sensing of the light sensing device SR is increased, which contributes to improving the light sensing sensitivity and accuracy of the touch display panel 10. In the embodiment, the spacing d5 is substantially equal to the spacing d6, but it is not limited thereto. In other embodiments, the spacing d5 may not be equal to the spacing d6 but yet greater than the spacing d2.

Similarly, the light sensing devices SR are disposed on opposite sides of the pixel opening POc in the direction Y, so with the spacing (e.g., the spacing d7 on the first side POcs1) between the edge PDLe3 of the pixel opening POc and the edge TEe3 of the electrode opening TEc on the same side in the direction Y along the direction Y being greater than the spacing d2, the light emitted by the light emitting structure ES3 may be prevented from being reflected to the light sensing layer SRL of the adjacent light sensing device SR through the surface TELs of the touch electrode layer TEL, and therefore the signal-to-noise ratio of the sensing of the light sensing device SR is increased, which contributes to improving the light sensing sensitivity and accuracy of the touch display panel 10.

Note that since no light sensing device SR is disposed on opposite sides of the pixel opening POc in the direction X, a spacing d8 between the edge PDLe3 of the pixel opening POc and the edge TEe3 of the electrode opening TEc on the same side of the pixel opening POc along the direction X may be less than the spacing d7, which contributes to increasing the design flexibility of the light emitting structure ES3. However, the disclosure is not limited thereto. According to other embodiments, the spacing d8 may also be equal to the spacing d7.

In the embodiment, the light emitting colors of the light emitting structure ES1, the light emitting structure ES2, and the light emitting structure ES3 are blue, green, and red, respectively. Referring to FIG. 3 as well, since the light sensing layer SRL of the light sensing device SR has different absorptance for light with different wavelengths, the ratio relationship of the spacing d1 (or the spacing d4), the spacing d5 (or the spacing d6), and the spacing d7 may be adjusted according to the relationship between the absorptance of the light sensing layer SRL for light with different wavelengths. For example, in the embodiment, the absorptance of blue light (e.g., a wavelength of 450 nm) of the light sensing layer SRL is greater than the absorptance of green light (e.g., a wavelength of 550 nm), and the absorptance of green light is greater than the absorptance of red light (e.g., a wavelength of 615 nm). Therefore, the spacing d1 may be greater than the spacing d5, and the spacing d5 may be greater than the spacing d7. Accordingly, this contributes to increasing the design flexibility of the light emitting structure of different light emitting colors (e.g., the relative size or configuration of the light emitting surface).

From another point of view, the ratio relationship of the spacing d1 (or the spacing d4), the spacing d5 (or the spacing d6), and the spacing d7 may further be adjusted according to light colors for illuminating a surface to be identified (e.g., a fingerprint) when light sensing (e.g., fingerprint recognition) is performed. For example, in the embodiment, the illuminating light for light sensing is blue light and green light, respectively, so the spacing d1 (or the spacing d4) between the edge PDLe1 of the pixel opening POa and the edge TEe1 of the electrode opening TEa on one side of the pixel opening POa where the light sensing device SR is disposed and the spacing d5 (or the spacing d6) between the edge PDLe2 of the pixel opening POb and the edge TEe2 of the electrode opening TEb on one side of the pixel opening POb where the light sensing device SR is disposed should be increased, and the spacing d1 (or the spacing d4) and the spacing d5 (or the spacing d6) are greater than the spacing (e.g., the spacing d2, the spacing d3, and the spacing d8) between the edge of the pixel opening and the edge of the electrode opening on the side of the pixel opening where no light sensing device SR is disposed.

In another embodiment, when the illuminating light for light sensing is only blue or green light, it requires to increase only the spacing (e.g., the spacing d1 or the spacing d5) between the edge of the pixel opening corresponding to the light emitting color and the edge of the electrode opening on one side of the pixel opening where the light sensing device SR is disposed, and this spacing is greater than the spacing between the edge of the pixel opening and the edge of the electrode opening on one side of the pixel opening where no light sensing device SR is disposed.

Note that in the embodiment, the configuration of the pixel openings POa, the pixel openings POb, the pixel openings POc, and the light sensing device SR is only for illustration, and the disclosure is not limited thereto. In other embodiments, the configuration of the pixel openings and the light sensing devices SR may be adjusted according to actual product design (e.g., the configuration or size of the light emitting surface of the light emitting structure, the type of light emitting color, or the quantity of the light sensing devices SR to be disposed).

Figure 4:
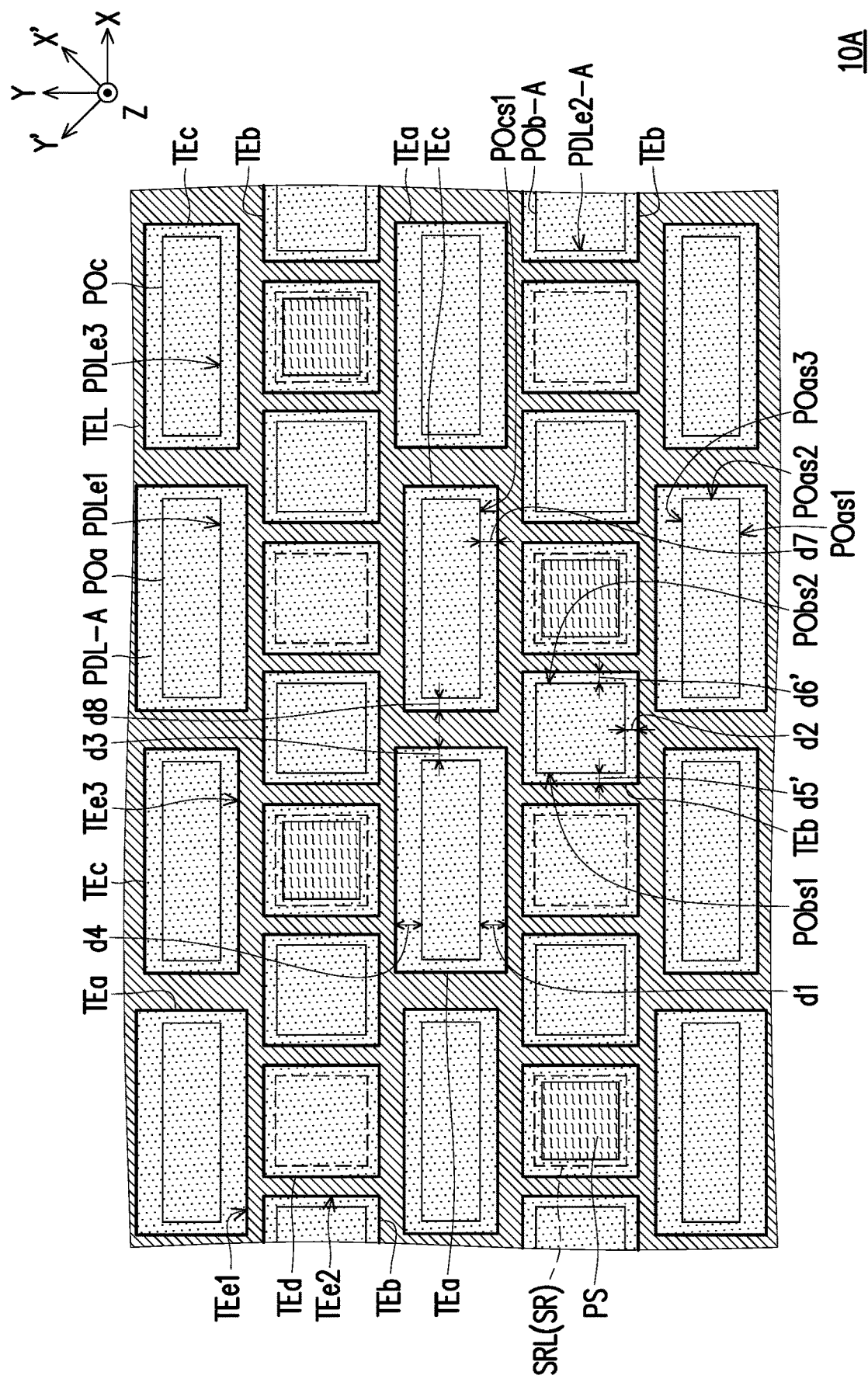
FIG. 4 is a schematic top view of a touch display panel according to another embodiment of the disclosure.

FIG. 4 is a schematic top view of a touch display panel according to another embodiment of the disclosure. Referring to FIG. 4, the difference between a touch display panel 10A of the embodiment and the touch display panel 10 of FIG. 1 is that the spacings (e.g., a spacing d5' and a spacing d6') between an edge PDLe2-A of a pixel opening POb-A of a pixel defining layer PDL-A of the touch display panel 10A and the edge TEe2 of the electrode opening TEb on opposite sides in the direction X may be substantially equal to the respective spacings (e.g., the spacing d2) on opposite sides in the direction Y, but the disclosure is not limited thereto. In other embodiments, at least one of the spacing d5' and the spacing d6' may also be greater than the spacing d2 but yet less than the spacing d1.

Specifically, in the embodiment, when the illuminating light for light sensing is only blue light, it requires to increase only the spacing (e.g., the spacing d1 or the spacing d4) between the edge of the pixel opening (e.g., the pixel opening POa) corresponding to the light emitting color and the edge of the electrode opening on one side of the pixel opening where the light sensing device SR is disposed, and this spacing is greater than the spacing between the edge of any pixel opening and the edge of the electrode opening on one side of the any pixel opening where no light sensing device SR is disposed. Accordingly, this contributes to increasing the design flexibility of the light emitting structure.

On the other hand, in the embodiment, the spacers PS are disposed on part of the light sensing device SR only. In other words, the disclosure does not limit the quantity and the configuration of the spacers PS. In other embodiments, the configuration of the spacers PS on the light sensing device SR may be adjusted according to actual product design or manufacturing process requirements.

In summary, in the touch display panel of an embodiment of the disclosure, two pixel openings of the pixel defining layer are overlapped with two electrode openings of the touch electrode layer, respectively. The spacing between the edge of one pixel opening and the edge of the corresponding electrode opening on one side of the pixel opening where the light sensing device is disposed is greater than the spacing between the edge of another pixel opening and the edge of another corresponding electrode opening on one side of the another pixel opening where no light sensing device is disposed. Accordingly, the light emitted by the light emitting structure disposed in the pixel opening may be prevented from being transmitted to the light sensing device through the internal reflection of the touch electrode layer, and thereby the light sensing sensitivity and accuracy of the touch display panel are improved.

What is claimed is:

1. A touch display panel, comprising:
   a first substrate;
   a second substrate disposed opposite to the first substrate;
   a pixel defining layer disposed on the first substrate and comprising a first pixel opening and a second pixel opening, wherein the first pixel opening and the second pixel opening are adjacently disposed along a first direction;
   a first light emitting structure and a second light emitting structure disposed in the first pixel opening and the second pixel opening, respectively;
   a first light sensing device adjacently disposed on a first side of the first pixel opening along a second direction, wherein the first direction intersects the second direction; and
   a touch electrode layer disposed on the second substrate and comprising a first electrode opening, a second electrode opening, and a third electrode opening of the first light sensing device overlapped with the first light emitting structure and the second light emitting structure, respectively, wherein the touch electrode layer comprises a first edge defining the first electrode opening, the pixel defining layer comprises a second edge defining the first pixel opening, the first edge and the second edge comprise a first spacing along the second direction on the first side of the first pixel opening, the touch electrode layer further comprises a third edge defining the second electrode opening, the pixel defining layer further comprises a fourth edge defining the second pixel opening, the third edge and the fourth edge comprise a second spacing on a same side of the second pixel opening along the second direction, and the first spacing is greater than the second spacing.

2. The touch display panel according to claim 1, wherein a light emitting color of the first light emitting structure is green or blue, and a light emitting color of the second light emitting structure is red.

3. The touch display panel according to claim 1, wherein the first edge and the second edge comprise a third spacing on a second side of the first pixel opening along the first direction, and the third spacing is not equal to the first spacing.

4. The touch display panel according to claim 3, wherein the second pixel opening is disposed on the second side of the first pixel opening, and the third spacing is less than the first spacing.

5. The touch display panel according to claim 4, further comprising:
   a second light sensing device adjacently disposed with the first pixel opening along the second direction and disposed on a third side of the first pixel opening, wherein the first side is opposite to the third side, the first edge and the second edge comprise a fourth spacing along the second direction on the third side of the first pixel opening, and the fourth spacing is greater than the second spacing.

6. The touch display panel according to claim 1, wherein the first light sensing device and the second pixel opening are disposed adjacently along a third direction and disposed on a first side of the second pixel opening, the third direction intersects the first direction and the second direction, the third edge and the fourth edge comprise a third spacing along the third direction on the first side of the second pixel opening, and the third spacing is greater than the second spacing.

7. The touch display panel according to claim 6, wherein a light emitting color of the first light emitting structure is blue, and a light emitting color of the second light emitting structure is green.

8. The touch display panel according to claim 6, further comprising:
   a second light sensing device adjacently disposed with the second pixel opening along the third direction and disposed on a second side of the second pixel opening, wherein the first side is opposite to the second side, the third edge and the fourth edge comprise a fourth spacing along the third direction on the second side of the second pixel opening, and the fourth spacing is greater than the second spacing.

9. The touch display panel according to claim 8, further comprising:
   a third light emitting structure, wherein the pixel defining layer further comprises a third pixel opening, and the third light emitting structure is disposed in the third pixel opening, wherein the second light sensing device and the third pixel opening are disposed adjacently along the second direction and disposed on a first side of the third pixel opening, the touch electrode layer further comprises a fifth edge defining the third electrode opening, the pixel defining layer also comprises a sixth edge defining the third pixel opening, the fifth edge and the sixth edge comprise a fifth edge along the second direction on the first side of the third pixel opening, and the fifth spacing is less than the first spacing.

10. The touch display panel according to claim 9, wherein light emitting colors of the first light emitting structure, the second light emitting structure, and the third light emitting structure are blue, green, and red, respectively.

* * * * *